United States Patent
Parla et al.

(10) Patent No.: US 10,187,414 B2
(45) Date of Patent: Jan. 22, 2019

(54) DIFFERENTIAL MALWARE DETECTION USING NETWORK AND ENDPOINT SENSORS

(71) Applicant: Cisco Technology, Inc., San Jose, CA (US)

(72) Inventors: Vincent E. Parla, North Hampton, NH (US); Andrey Zawadowskiy, Hollis, NH (US); Donovan O'Hara, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 212 days.

(21) Appl. No.: 15/214,905

(22) Filed: Jul. 20, 2016

(65) Prior Publication Data
US 2018/0026993 A1  Jan. 25, 2018

(51) Int. Cl.
*H04L 29/06* (2006.01)

(52) U.S. Cl.
CPC .............. *H04L 63/1425* (2013.01)

(58) Field of Classification Search
CPC .......................... H04L 63/1425; H04L 63/145
USPC ...................................................... 726/22–24
See application file for complete search history.

(56) References Cited

U.S. PATENT DOCUMENTS 7,346,922 B2 * 3/2008 Miliefsky ........... H04L 63/0272
 726/11
8,181,247 B1 * 5/2012 Pavlyushchik ....... G06F 21/552
 726/22
8,272,054 B2 * 9/2012 Dequevy ............. H04L 63/1425
 713/182

(Continued)

OTHER PUBLICATIONS

J. Hao et al., "A Methodology to Detect Kernel Level Rootkits Based on Detecting Hidden Process", International Conference on Apperceiving Computing and Intelligence Analysis, ICACIA 2008, Dec. 13-15, 2008, IEEE, DOI: 10.1109/ICACIA.2008.4770042, 3 pages.

(Continued)

*Primary Examiner* — Jahangir Kabir
(74) *Attorney, Agent, or Firm* — Edell, Shapiro & Finnan, LLC (57) ABSTRACT

A method is disclosed in which a system compares a first set of reports characterizing network traffic flows originating from an endpoint device with a second set of reports characterizing network traffic flows originating from the endpoint device and stored at an external network device to determine whether the first set and second set of reports characterizing network traffic flows originating from an endpoint device are different. In response to determining that the first and second reports characterizing network traffic flows are different, the system identifies the network traffic flows originating from the endpoint device and reported by an external network device, but not reported by the endpoint device, as possibly indicative of malware and forwards the network traffic flows originating from the endpoint device to an analyzer for further processing. Thus, an observed difference between network traffic flows originating from an endpoint device and stored at the endpoint device and network traffic flows originating from the endpoint device and stored on an external network device are compared to detect the presence of malware residing on the endpoint device.

20 Claims, 9 Drawing Sheets

(56) References Cited

U.S. PATENT DOCUMENTS

| | | | | |
|---|---|---|---|---|
| 8,631,496 | B2* | 1/2014 | Dequevy | H04L 63/1425 |
| | | | | 726/24 |
| 8,839,435 | B1* | 9/2014 | King | H04L 63/1425 |
| | | | | 726/22 |
| 9,491,142 | B2* | 11/2016 | Xie | G06F 21/00 |
| 2011/0258610 | A1 | 10/2011 | Aaraj et al. | |
| 2013/0052992 | A1* | 2/2013 | Lee | G06F 21/52 |
| | | | | 455/411 |
| 2015/0007316 | A1 | 1/2015 | Ben-Shalom et al. | |
| 2015/0128263 | A1 | 5/2015 | Raugas et al. | |
| 2015/0326486 | A1* | 11/2015 | Zawadowskiy | H04L 47/36 |
| | | | | 709/224 |
| 2017/0063893 | A1* | 3/2017 | Franc | H04L 63/0281 |

OTHER PUBLICATIONS

Ashwin Ramaswamy, "Detecting kernel rootkits", Masters Thesis Proposal, Dartmouth Computer Science Technical Report, TR2008-627, Proposal Presentation Date: Sep. 2, 2008, Department of Computer Science, Dartmouth College, 30 pages.

* cited by examiner

| SRC IP | DST IP | SR PORT | DST PORT | PROTOCOL |
|---|---|---|---|---|
| 10.131.66.120 | 17.172.224.47 | 1025 | 443 | TCP |
| 10.131.66.120 | 172.217.3.14 | 1026 | 443 | TCP |

NETWORK TRAFFIC FLOWS AS REPORTED BY ENDPOINT HOST

FIG. 7B

| SRC IP | DST IP | SR PORT | DST PORT | PROTOCOL |
|---|---|---|---|---|
| 10.131.66.120 | 17.172.224.47 | 1025 | 443 | TCP |
| 10.131.66.120 | 172.217.3.14 | 1026 | 443 | TCP |
| 10.131.66.120 | 54.239.28.188 | 56777 | 443 | TCP |

NETWORK TRAFFIC FLOWS AS REPORTED BY THE R1 ROUTER

FIG. 7C

| SRC IP | DST IP | SR PORT | DST PORT | PROTOCOL |
|---|---|---|---|---|
| 10.131.66.120 | 17.172.224.47 | 1025 | 443 | TCP |
| 10.131.66.120 | 172.217.3.14 | 1026 | 443 | TCP |
| 10.131.66.120 | 54.239.28.188 | 56777 | 443 | TCP |

NETWORK TRAFFIC FLOWS AS REPORTED BY THE R2 ROUTER

FIG. 8A

| SRC IP | DST IP | SR PORT | DST PORT | PROTOCOL |
|---|---|---|---|---|
| 10.131.66.120 | 17.172.224.47 | 1025 | 443 | TCP |
| 10.131.66.120 | 172.217.3.14 | 1026 | 443 | TCP |

NETWORK TRAFFIC FLOWS AS REPORTED BY ENDPOINT HOST

FIG. 8B

| SRC IP | DST IP | SR PORT | DST PORT | PROTOCOL |
|---|---|---|---|---|
| 10.131.66.120 | 17.172.224.47 | 1025 | 443 | TCP |
| 10.131.66.120 | 172.217.3.14 | 1026 | 443 | TCP |

NETWORK TRAFFIC FLOWS AS REPORTED BY THE R1 ROUTER

FIG. 8C

| SRC IP | DST IP | SR PORT | DST PORT | PROTOCOL |
|---|---|---|---|---|
| 10.131.66.120 | 17.172.224.47 | 1025 | 443 | TCP |
| 10.131.66.120 | 172.217.3.14 | 1026 | 443 | TCP |
| 10.131.66.120 | 54.239.28.188 | 56777 | 443 | TCP |

NETWORK TRAFFIC FLOWS AS REPORTED BY THE R2 ROUTER

DIFFERENTIAL MALWARE DETECTION USING NETWORK AND ENDPOINT SENSORS

TECHNICAL FIELD

The present disclosure relates to detecting hidden malware on an endpoint device communicating in a computer networking system.

BACKGROUND

Malware installed on an endpoint device will often use "stealth" techniques to avoid traditional threat detection methods and remain hidden from system administrators. The level of sophistication of malware has evolved such that the malicious software residing on an endpoint device will often evade endpoint detection systems by hooking out functions in both the user and kernel space. For example, a hidden rootkit may hide its file input/output (I/O) activities from antivirus software that uses a file system driver to detect file I/O processing. A rootkit might also hook out network monitoring entry points as a further means to avoid detection.

DESCRIPTION OF EXAMPLE EMBODIMENTS

Overview

In accordance with one embodiment, a method is disclosed in which a comparison is made between a first network traffic flow report originating from an endpoint device and a second network traffic flow report originating from a network device for network traffic originating from the endpoint device to determine whether the reported network traffic flows are different. In response to determining that the first and second network traffic flow reports are different, the reported network traffic flows originating at the endpoint device are identified as possibly being indicative of malware and both sets of network traffic flow reports are forwarded to an analyzer for further processing. Thus, network traffic flows originating from an endpoint device and reported from the endpoint device are compared with network traffic flows originating from the endpoint device but reported from at least one network device to detect the presence of malware residing on the endpoint device.

Example Embodiments

Figure 1:
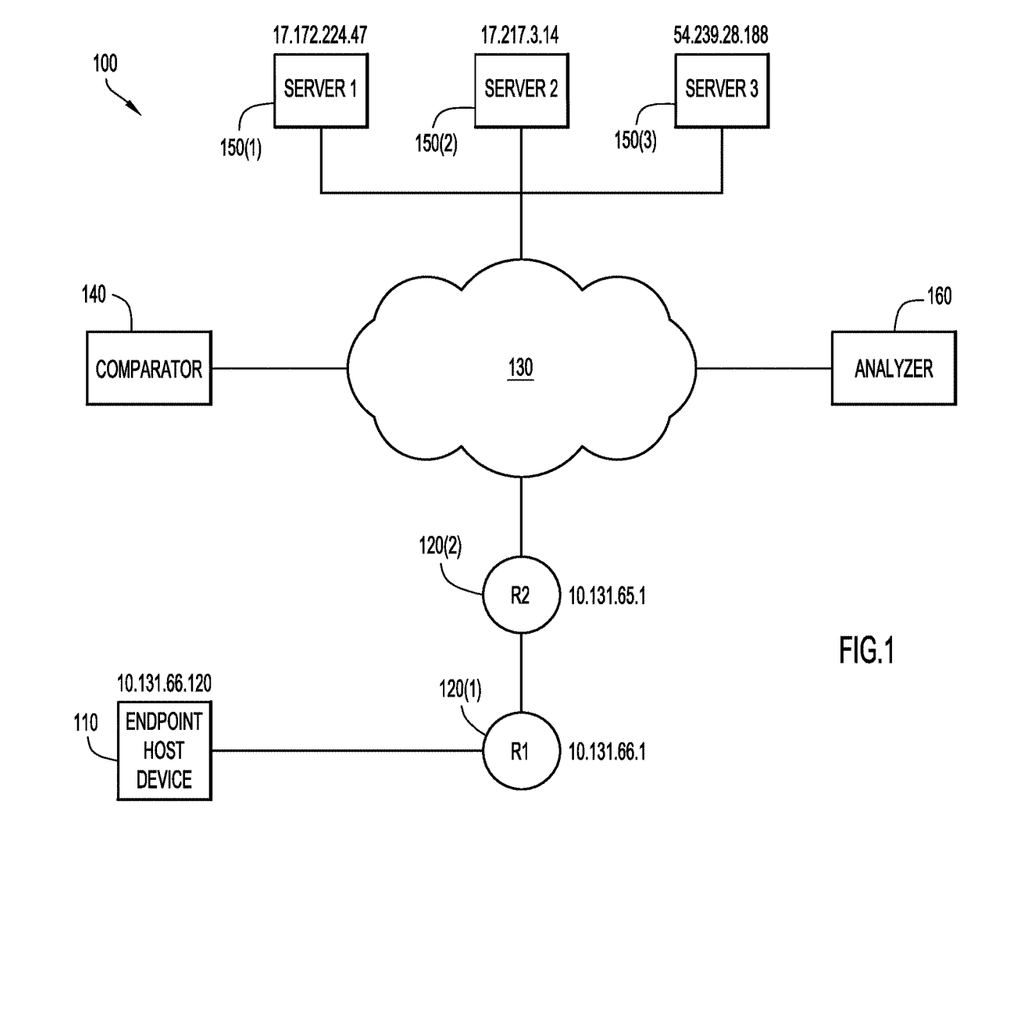
FIG. 1 is a block diagram of a network environment in which a differential analysis of network traffic flows is employed to detect malware on a host device, according to an example embodiment.

With reference first to FIG. 1, there is depicted a block diagram of a network environment 100 in which a differential analysis of network traffic flows is employed to detect malware on a host endpoint device. Network access environment 100 includes a host endpoint device 110, one or more network devices, e.g., network devices 120(1) and 120(2), which are in communication over network 130 with a comparator device 140, one or more server/controllers, e.g., servers 150(1)-150(3), and an analyzer device 160. Endpoint host device 110 may be any wired or wireless communication device configured to generate and transmit data/packet flows to the one or more servers requesting data and/or services from the one or more servers, wherein the generated network traffic flows through at least one network device 120(1) or 120(2). For example, endpoint host device 110 may be a laptop, desktop computer, tablet, smartphone, etc. According to an embodiment, the data flows transmitted by endpoint host device 110 may be Internet Protocol ("IP") packets. According to a further embodiment, endpoint host device 110 may generate the network traffic flows by encapsulating requests for data and/or services from the one or more servers 150(1)-150(3) in IP headers indicating address information of endpoint device 110 as the source identifier (ID) and address information of the one or more servers 150 as the destination ID.

Network 130 may include one or more wide area networks (WANs), such as the Internet, and one or more local area networks (LANs). The one or more network devices, e.g., 120(1) and 120(2), are configured to route one or more network traffic flows requesting data and/or services transmitted from endpoint device 110 over network 130 to the one or more servers 150(1)-150(3). The one or more network devices may be a wireless access point, gateway, router, switch, etc., deployed to coordinate the reception and transmission of data packets between endpoint host device 110 and a server/controller 150(1)-150(3), and enable communication between endpoint device 110, one or more servers 150(1)-150(3), comparator 140 and analyzer 160. The one or more network devices may route or switch network traffic flows in accordance with any communication/network technology, including, but not limited to, IPv4, IPv6, TCP, UDP, Ethernet, Wi-Fi®, 4G or LTE, etc. According to an embodiment, network devices 120(1) and 120(2) may route network traffic flows from endpoint device 110 to the one or more servers 150(1)-150(3) using addressing information included in a header encapsulating the network traffic flows. According to a further embodiment, the one or more network traffic flows originating from the host device may be an IP packet flow. For example, endpoint device 110 may have an IPv4 address of 10.131.66.120 and destination server 150(1) may have an IPv4 address of 17.172.224.47. Accordingly, endpoint device 110 may generate a network traffic flow requesting data and/or services from server 150(1) having a source address of 10.131.66.120 and a destination address of 17.172.224.47, and may transmit the network traffic flow to the nearest network device 120(1), which as shown in FIG. 1, may have an IPv4 address of 10.131.66.1.

After receiving the network traffic flows from endpoint device 110, network device 120(1) may store the network traffic flows in its memory and, using mapping information stored in its memory, forward the network traffic flows to network device 120(2), which may have an IPv4 address of 10.131.65.1. According to an embodiment, network device 120(1) may be the network device that is nearest, in number of hops, to the host device. Similarly, network device 120(2) may store the network traffic flows received from network device 120(1) in its memory and forward the network traffic flows to server 150(1), having an IPv4 address matching the destination ID indicated in the network traffic flow header. As further shown in FIG. 1, server 150(2) may have an IPv4 address of 172.217.3.14 and server 150(3) may have an address of 54.239.28.188.

Comparator 140 is configured to receive reports from endpoint host device 110 on a plurality of network traffic flows originating at endpoint host device 110 as well as reports from one or more network devices, e.g., network devices 120(1) and 120(2). Comparator 140 is further configured to correlate the plurality of network traffic flows summarized in the received reports based on various attributes identifying the individual network traffic flows and to compare the correlated network traffic flows with each other to determine whether they are identical. According to an embodiment, a network traffic flow may be one or more data packets transmitted within a specific timeframe and sharing a number of attributes, including, but not limited to, timestamps, IP source address, IP destination address, source MAC address, source port, destination port, Layer 3 protocol type, class of service, router or switch interface, and bi-flow byte counts. According to a further embodiment, the set of attributes identifying a specific data flow may be indicated in an IP flow information export ("IPFIX") data packet reported by endpoint device 110 and/or a network device 120(1) or 120(2). The comparator 140 may be a network-connected device (with storage and processing capabilities) configured as a comparator to receive and process IP traffic flow reports from the endpoint device 110 and similar reports from one or more network devices 120(1) and 120(2). Similarly, analyzer 160 may be a network-connected device (with storage and processing capabilities) configured to receive and process IP traffic flow reports and other data received from the comparator 140, as described herein. While comparator 140 and analyzer 160 are shown as separate entities, it should be understood that the operations of comparator 140 and analyzer 160 may be performed entirely at comparator 140, entirely at analyzer 160, or some operations may be performed at comparator 140 and/or at analyzer 160.

The IP traffic flow reports may be reported in accordance with the NetFlow technology developed by Cisco Systems, Inc., for example. NetFlow technology developed by Cisco Systems, Inc. allows system administrators to monitor IP traffic flows to facilitate more accurate capacity planning and ensure that resources are used appropriately in support of organizational goals. In accordance with the NetFlow technology, all packets with the same source/destination IP address, source/destination ports, protocol interface and class of service are grouped into a flow and then packets and bytes are tallied. This methodology of fingerprinting or determining a flow is scalable because a large amount of network information is condensed into a database of NetFlow information called the NetFlow cache. NetFlow reports the flows to a NetFlow collector server, which combines or aggregates the flows to produce data used for traffic and security analysis. The NetFlow reports may comprise 30 to 50 network traffic flows bundled together and are typically transported in Universal Datagram Protocol (UDP) format to the NetFlow collector server. NetFlow is only one example of a network traffic data reporting technology, and the disclosure presented herein is not to be limited to NetFlow or any particular network traffic data reporting technology.

Thus, network traffic originating from endpoint device 110 may have a sufficiently large set of attributes identifying a specific network traffic flow such that comparator 140 may successfully correlate the associated network traffic flows based on the attributes available for consideration. For example, if comparator 140 successfully correlates the reports received from endpoint device 110 about network traffic flows originating from endpoint device 110 with the reports received from the one or more network devices 120(1) or 120(2) about the one or more network traffic flows at network device 120 originating from endpoint device 110, comparator 140 will compare the correlated network traffic flows to determine whether they are identical. If comparator 140 determines that the correlated network traffic flows are not identical, it may log the network traffic flows as suspicious and forward the reports summarizing the correlated network traffic flows to analyzer 160 for further processing to determine whether endpoint device 110 is compromised with malicious software. According to an embodiment, the malicious software may include a rootkit that has been hooked out into one or more authorized applications resident on endpoint device 110.

Generally, endpoint device 110 transmits requests to one or more network devices 120(1) or 120(2) for data and/or services from one or more servers 150(1)-150(3), which route the network traffic flows to the one or more servers 150(1)-150(3). According to an embodiment, endpoint device 110 generates and transmits network traffic flows in response to requests from one or more applications resident on endpoint device 110. Endpoint device 110 stores the transmitted network traffic flows and may send reports about the stored network traffic flows to comparator 140. Each of the one or more network devices 120(1) and 120(2) that route the network traffic flows originating at endpoint device 110 may also store network traffic flows received from endpoint device 110 and send reports about the network traffic flows to comparator 140. Comparator 140 may correlate the reports summarizing (in metadata) network traffic flows originating from endpoint device 110 and stored at endpoint device 110 with the reports summarizing network traffic flows stored at the one or more network devices 120 and compare the correlated reports summarizing the network traffic flows to determine whether they are identical. If comparator 140 determines that the reported network traffic flows stored at the one or more network devices 120 are not identical to the reported network traffic flows stored at endpoint device 110, the comparator 140 may log the network traffic flows as being suspicious and forward the reports summarizing the network traffic flows logged as suspicious to analyzer 160 for further processing to determine whether unauthorized software is resident on endpoint device 110.

Figure 2:
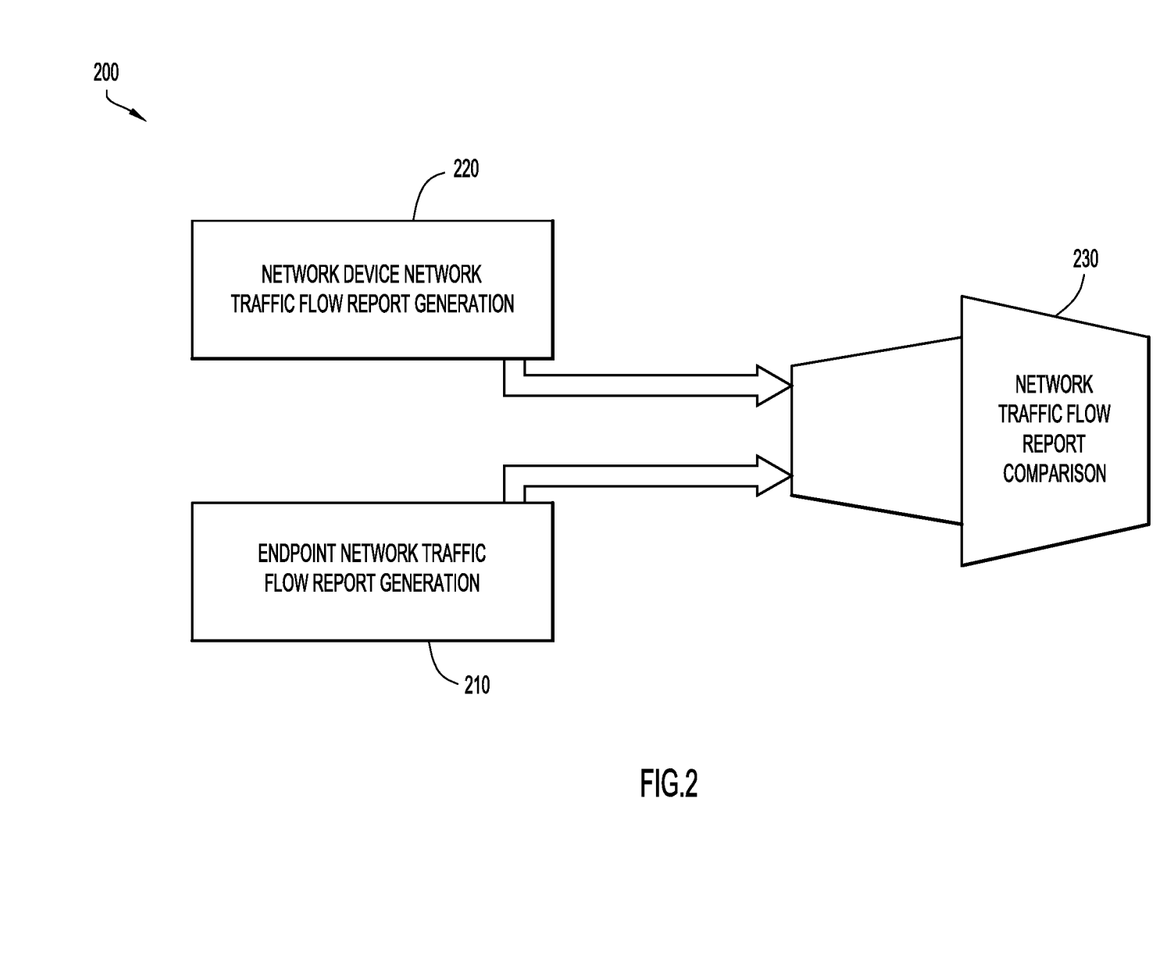
FIG. 2 is a high-level flow diagram of a differential analysis network traffic compare process, according to an example embodiment.

Referring now to FIG. 2, a high-level flow diagram of a network traffic compare process 200 is shown that may be used in connection with network environment shown in FIG. 1, according to an example embodiment. As shown in FIG. 2, the network traffic compare process 200 includes an endpoint network traffic flow report generation step 210, a network device network traffic flow report generation step 220, and a network traffic flow report comparison step 230. Endpoint network traffic flow report generation step 210, performed at endpoint device 110, involves generating network traffic flows originating at endpoint device 110 and reports about the generated network flows that are sent to comparator 140 (FIG. 1), where the comparison step 230 is performed. Similarly, network device network traffic flow report generation step 220, performed on a network device, e.g., network device 120(1) or 120(2), involves storing network traffic flows originating at endpoint device 110 and received at the network device and forwarding reports including metadata about the network traffic flows to comparator 140, where the comparison step 230 is performed. The network traffic flow report comparison step 230, performed by comparator 140, involves correlating the received reports summarizing network traffic flows based on identifying attributes, and comparing associated network traffic flows with each other to determine whether the associated network traffic flows are identical. If the comparison step 230 determines that the associated network traffic flows are not identical, i.e., reveals missing/non-reported network traffic flows, comparator 140 marks the network traffic flows originating from endpoint host device 110 as possibly containing data and/or requests indicative of malicious software, which may be attempting to hide the endpoint data and/or requests, and forwards the reports summarizing the associated network traffic flows to analyzer 160 for further processing to determine whether unauthorized software is resident on endpoint device 110.

Figure 3:
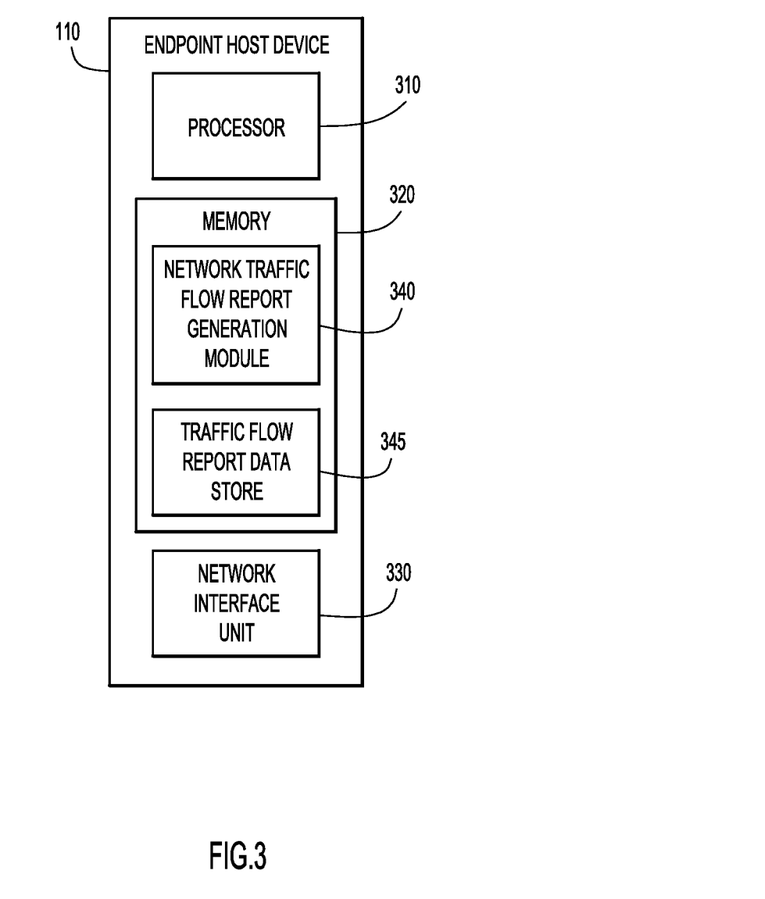
FIG. 3 is a block diagram of an endpoint host device configured to participate in the differential analysis methods presented herein, according to an example embodiment.

With reference to FIG. 3, the endpoint host device 110 of FIG. 1 is now described in more detail. Endpoint device 110 includes one or more processors 310, a memory 320, which stores network traffic flow report generation module 340 and traffic flow report data store 345, and a network interface unit 330. The one or more processors 310 may be a microprocessor or a microcontroller. Network interface unit 330 enables endpoint device 110 to communicate with one or more network devices 120 via network communications, such as wired or wireless network communications. Memory 320 may include read only memory (ROM), random access memory (RAM), magnetic disk storage media devices, optical storage media devices, flash memory devices, electrical, optical, or other physical/tangible memory storage devices. Processor 310 executes instructions stored in memory 320. For example, processor 310 may execute instructions of network traffic flow report generation module 340 to generate reports summarizing network traffic originating from the endpoint host device 110 requesting data from one or more servers 150. In addition, memory 340 includes traffic flow report data store 345, which stores traffic flow reports generated by network traffic flow report generation module 340.

Thus, in general, memory 320 may include one or more tangible (non-transitory) computer readable storage media (e.g., a memory device) encoded with software comprising computer executable instructions and, when the software is executed (by processor 310), it is operable to perform the operations of endpoint host device 110 described herein.

Figure 4:
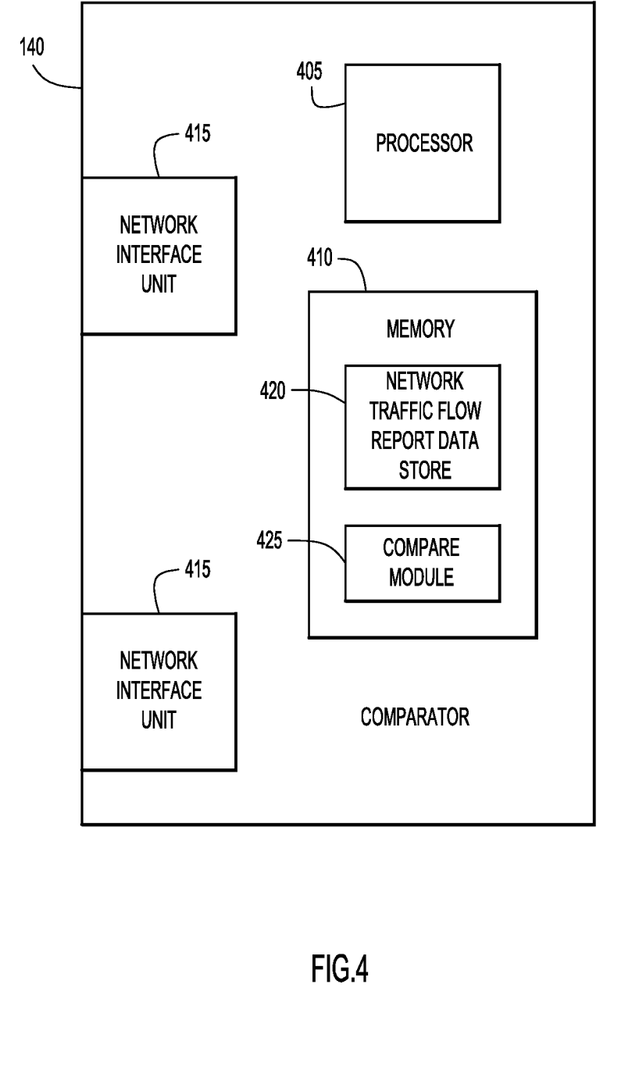
FIG. 4 is a block diagram of a comparator/collector device configured to participate in the differential analysis methods presented herein, according to an example embodiment.

With reference to FIG. 4, a block diagram illustrating a comparator device 140 is shown in more detail. The comparator 140 includes one or more processors 405, a memory 410, which stores network traffic flow report data store 420 and compare module 425, and one or more network interface devices 415. Processor 405 may be a microprocessor or microcontroller. Memory 410 may include read only memory (ROM), random access memory (RAM), magnetic disk storage media devices, optical storage media devices, flash memory devices, electrical, optical, or other physical/tangible memory storage devices. Processor 405 executes instructions stored in memory 410. The network interface devices 415 may be one or more network interface cards, for example. The memory 410 includes network traffic flow report data store 420, which stores network traffic flow reports received from endpoint device 110 and/or one or more network devices 120.

Thus, in general, memory 410 may include one or more tangible (non-transitory) computer readable storage media (e.g., a memory device) encoded with software comprising computer executable instructions and, when the software is executed (by processor 405), it is operable to perform the operations described herein in connection with the techniques described herein to detect the presence of malware on an endpoint host device 110. For example, processor 410 may execute instructions of compare module 425 to compare reports summarizing network traffic flows originating at endpoint device 110 and received from endpoint device 110 with reports summarizing network traffic flows originating at endpoint device 110 but received from network device 120 to detect whether unauthorized software is resident on endpoint device 110.

Figure 5:
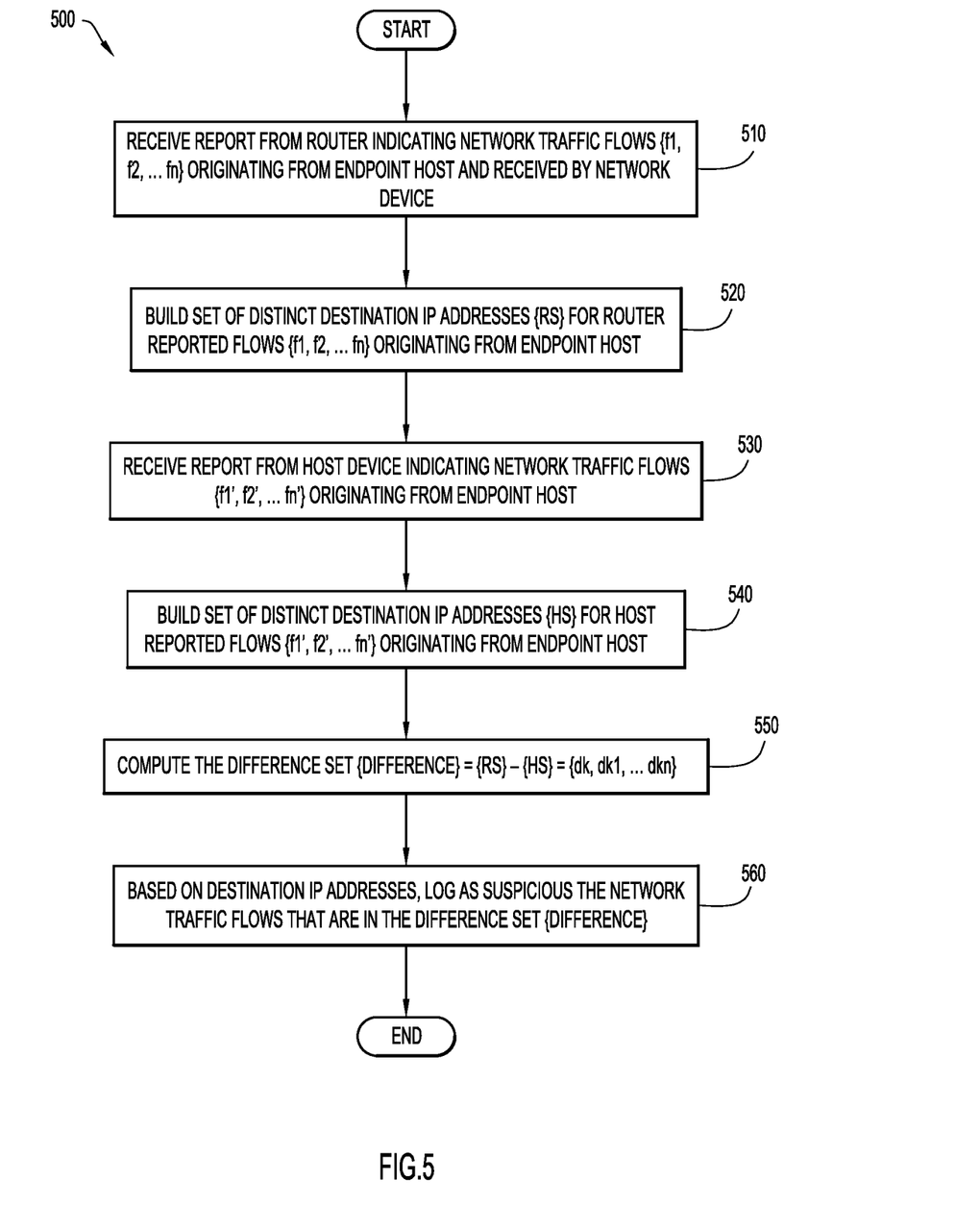
FIG. 5 is a flowchart of operations performed to detect the presence of malware on an endpoint device when an unauthorized rootkit connects to a unique destination IP address, according to an example embodiment.

With reference to FIG. 5, a flowchart is shown for example operations of a method 500 performed by comparator 140 to detect the presence of malware on an endpoint device 110 when an unauthorized rootkit connects to a unique destination IP address. Reference may also be made to FIG. 1 in connection with the description of FIG. 5.

At 510, comparator 140 receives a report from a network device (e.g., network 120(1) or 120(2), the report indicating flows {f1, f2, . . . fn} originating from endpoint host 110 and received by the network device. At 520, comparator 140 builds a set of distinct destination IP addresses {RS}={d1, d2, . . . dn} for network traffic flows {f1, f2, . . . fn} originating from endpoint host device 110 and reported by network device 120. According to an embodiment, comparator 140 builds the set of distinct destination IP addresses {RS} based on information indicated in IPFIX packets reported by network device 120.

At 530, comparator 140 receives a report from endpoint host device 110 indicating network traffic flows {f1', f2', . . . fn'} originating from endpoint host 110. At 540, comparator 140 builds a set of distinct destination IP addresses {HS}={d1', d2', . . . dn'} for network traffic flows {f1', f2', . . . fn'} originating from endpoint host device 110 and reported by endpoint host device 110. According to an embodiment, comparator 140 builds the set of distinct destination IP addresses {HS} based on information indicated in IPFIX packets reported by endpoint host device 110.

At 550, assuming operation 520 successfully builds a set of distinct destination IP addresses {RS} for network traffic flows {f1, f2, . . . fn} and operation 540 successfully builds a set of distinct destination IP addresses {HS} for network traffic flows {f1', f2', . . . fn'}, comparator 140 computes the difference set {difference}={RS}−{HS}={dk1, dk2, . . .

dkn} as the set of network traffic flows in set {RS} but not in set {HS}. Thus, comparator 140 subtracts the identical network traffic flows that are included in both set {HS} and in set {RS} to determine suspicious network traffic flows that may indicate the presence of unauthorized software on endpoint host device 110, and therefore may be of interest to network/security administrators.

At 560, based on destination IP addresses, comparator 140 logs as suspicious each network traffic flow that is included in the difference set {difference} and the process 500 ends.

Figure 6:
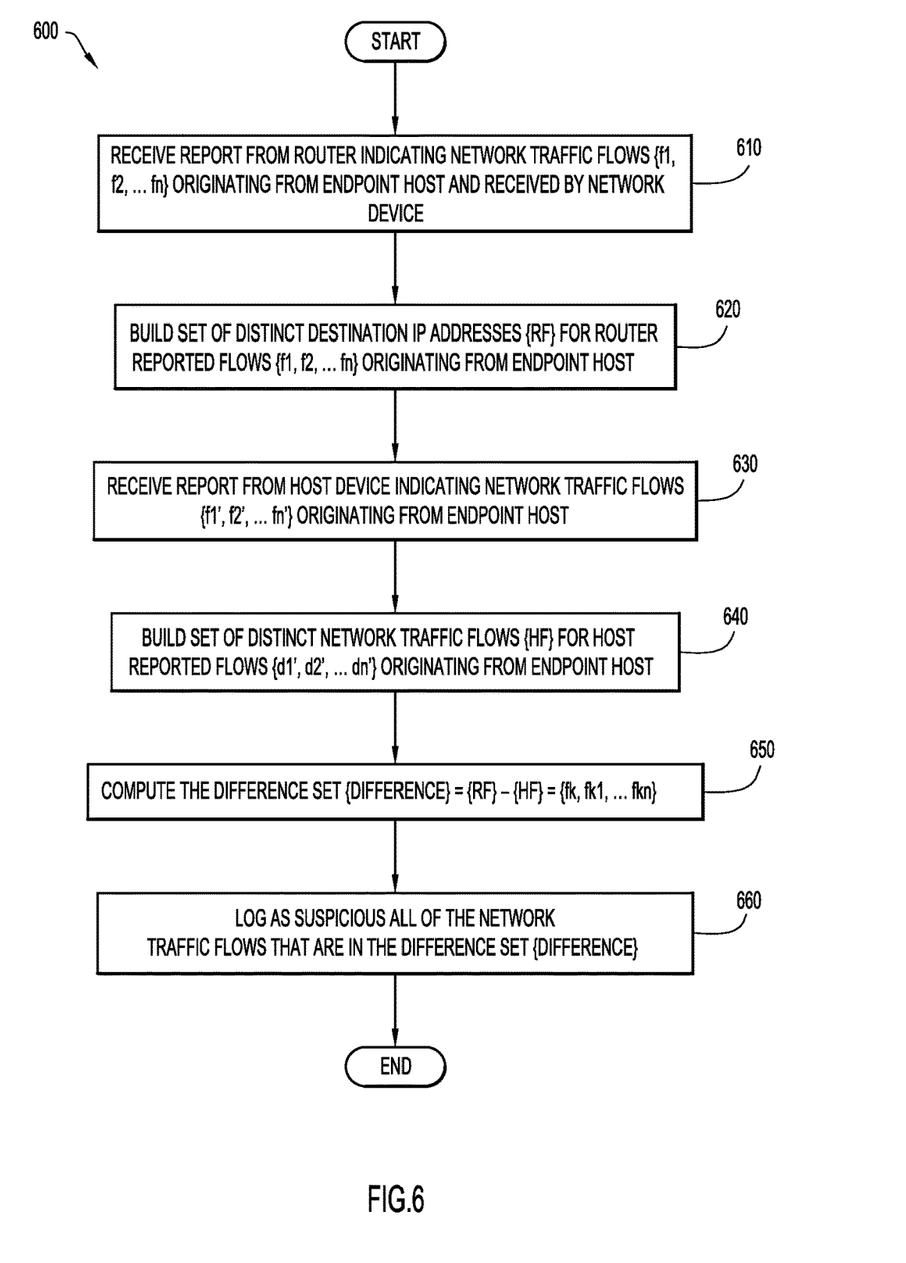
FIG. 6 is a flowchart of operations performed to detect the presence of malware on an endpoint device when an unauthorized rootkit connects to a destination IP address used by authorized applications installed on the endpoint device, according to an example embodiment.

With reference to FIG. 6, a flowchart is shown for example operations of a method 600 performed by comparator 140 to detect the presence of malware on endpoint device 110 when an unauthorized rootkit connects to a destination URL used by authorized applications installed on endpoint device 110. Reference may also be made to FIGS. 1 and 5 in connection with the description of FIG. 6.

At 610, comparator 140 receives a report from a network device, e.g., network device 120(1) or 120(2), the report indicating network traffic flows {f1, f2, . . . fn} originating from endpoint host 110 and received by the network device. At 620, comparator 140 builds a set of distinct flows {RF} for network traffic flows {f1, f2, . . . fn} originating from endpoint host device 110 and reported by the network device. In process 600, comparator 140 builds of set of distinct network traffic flows {RF}, vis-à-vis the set of distinct destination IP addresses {RS} built in process 500 of FIG. 5, because the unauthorized rootkit resident on endpoint device 110 connects to a destination IP address that is simultaneously used by authorized applications installed on endpoint device 110, e.g., goodware, and therefore destination IP addresses will not uniquely identify/detect the presence of malware on endpoint device 110. According to an embodiment, comparator 140 builds the set of all distinct network traffic flows {RF} based on information indicated in IPFIX packets reported by network device 120.

At 630, comparator 140 receives a report from endpoint host device 110 indicating network traffic flows {f1', f2', . . . fn'} originating from endpoint host device 110. At 640, comparator 140 builds a set of network traffic flows {HF} for network traffic flows {f1', f2', . . . fn'} originating from endpoint host device 110 and reported by endpoint host device 110. According to an embodiment, comparator 140 builds the set of distinct network traffic flows {HF} based on information indicated in IPFIX packets reported by endpoint host device 110.

At 650, assuming operation 620 successfully builds a set of distinct network traffic flows {RF} for network traffic flows {f1, f2, . . . fn} and operation 640 successfully builds a set of distinct flows {HF} for network traffic flows {f1', f2', . . . fn' }, comparator 140 computes the difference set {difference}={RF}−{HF}={fk, fk1, . . . fkn} as the set of network traffic flows in set {RF} but not in set {HF}. Thus, comparator 140 subtracts the identical network traffic flows that are included in both set {RF} and in set {HF} to determine suspicious network traffic flows that may indicate the presence of unauthorized software on endpoint host device 110, and therefore may be of interest to system administrators.

At 660, comparator 140 log as suspicious each network traffic flow that is included in the difference set {difference} and the process 600 ends.

Figure 7A:
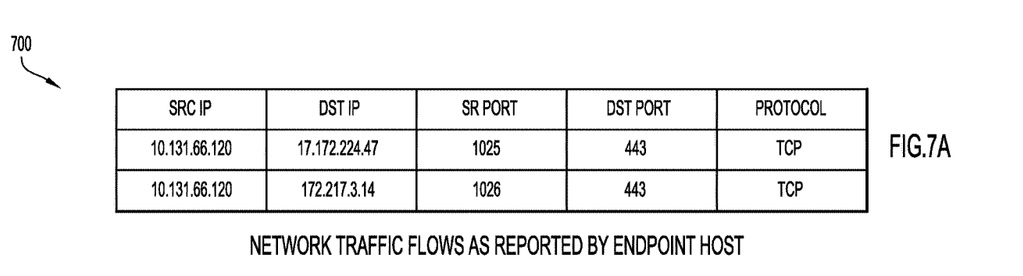
FIGS. 7A-7C illustrate data pertaining to network traffic flows representative of when an endpoint device has been compromised by an unauthorized malware application, according to an example embodiment.
Figure 7B:
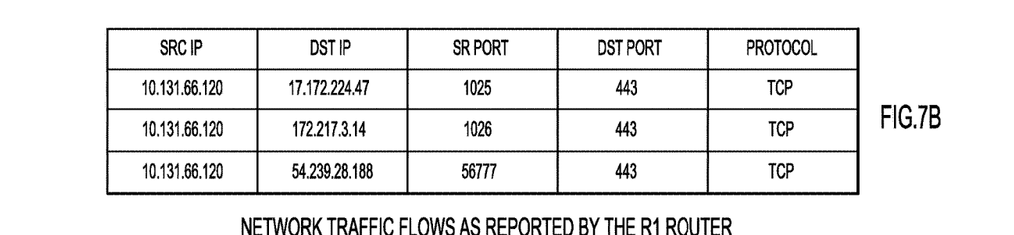
Figure 7C:
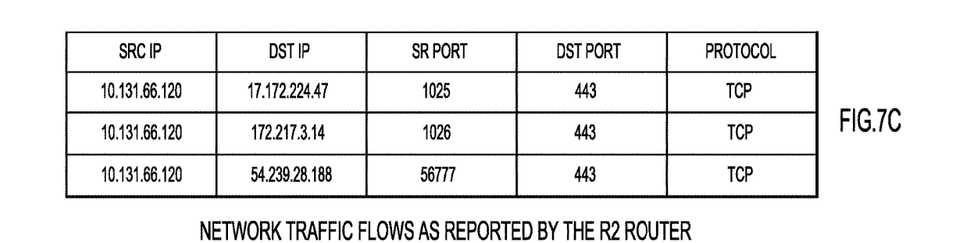

With reference to FIGS. 7A-7C, there is an illustration of an example network traffic flow related data 700 for network traffic flows when endpoint device 110 has been compromised by an unauthorized malware application, according to an embodiment. In the examples described herein, "stealth" malware may be resident on endpoint device 110, which, because it is "stealth" malware, communicates on a low level that is not visible to a security product running in either the kernel or user space. According to an embodiment, "stealth" malware may be implemented by firmware running on a network interface card (NIC) card and/or in the basic input/output operating system (BIOS). It should be readily understood that example 700 is for illustrative purposes only and is not a limiting example. Reference is made to FIG. 1 for purposes of this description.

In FIGS. 7A-7C, endpoint device 110 has generated three distinct network traffic flows. As shown in FIG. 7A, however, endpoint device 110 is compromised and reports only two network traffic flows to comparator 140, e.g., those with destination IP addresses 17.172.224.47 and 172.217.3.14. That is, endpoint device 110 reports only the network traffic flows transmitted to server 150(1) and to server 150(2). As shown in FIGS. 7B and 7C, network device 120(1) and network device 120(2) each report three network traffic flows to comparator 140 that originated from endpoint device 110. For example, as shown in FIGS. 7B and 7C, network device 120(1) and network device 120(2) both report network traffic flows originating from endpoint device 110 and directed towards server 150(3), i.e., IP address 54.239.28.188, that endpoint device 110 does not report.

After receiving the network traffic flows from endpoint device 110 and network devices 120(1) and 120(2), comparator 140 may compare the network traffic flows reported by endpoint device 110 and network devices 120(1) and 120(2) to determine the difference set {difference}={d3}={54.239.188}. In example 700, because comparator 140 may determine that the difference set {difference} does not equal the null set {Ø}, comparator 140 may log the unreported network traffic flow d3 as suspicious and forward the reports summarizing the suspicious network traffic flow to analyzer 160 for further processing to determine whether "stealth" malware is resident on endpoint device 110.

Figure 8A:
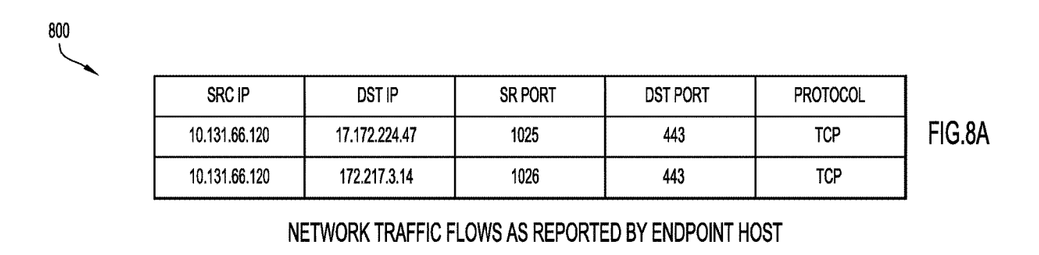
FIGS. 8A-8C illustrate data pertaining to network traffic flows representative of when both an endpoint device and a network device have been compromised by an unauthorized malware application, while at least one network device is not compromised, according to an example embodiment.
Figure 8B:
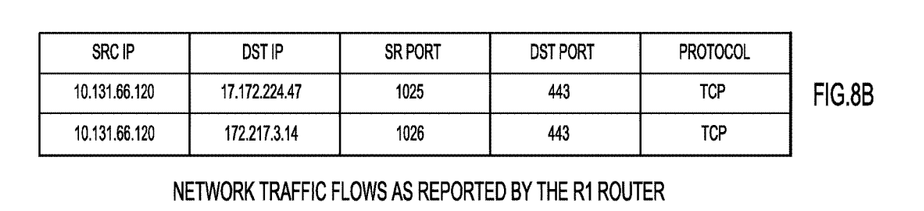
Figure 8C:
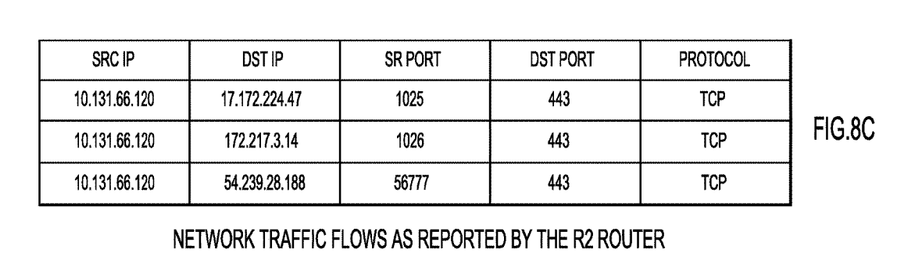

With reference now to FIGS. 8A-8C, there is an illustration of example network traffic flow related data 800 representative of when both endpoint device 110 and network device 120(1) have been compromised by an unauthorized malware application, while network device 120(2) has not been compromised, according to an embodiment. In the examples described herein, "stealth" malware may be resident on both endpoint device 110 and network device 120(1), which, because it is "stealth" malware, communicates on a low level that is not visible to a security product running in either the kernel or user space on either endpoint device 110 or network device 120(1), preventing network device 120(1) from reporting network flows to specific destinations, e.g., 54.239.28.188. As a result, network device 120(1) hides reporting certain communications to comparator 140. It should be readily understood that example 800 is for illustrative purposes only and is not a limiting example. Reference is made to FIG. 1 for purposes of this description.

In FIGS. 8A-8C, endpoint device 110 has generated three distinct network traffic flows. As shown in FIG. 8A, endpoint device 110 is compromised and reports only two network traffic flows to comparator 140, e.g., those with destination IP addresses 17.172.224.47 and 172.217.3.14. That is, endpoint device 110 reports only the network traffic flows transmitted to server 150(1) and to server 150(2). Furthermore, as shown in FIG. 8B, network device 120(1) is also compromised and similarly reports only two network traffic flows to comparator 140, e.g., those with destination IP addresses 17.172.224.47 and 172.217.3.14. As shown in FIG. 8C, however, network device 120(2) is not compromised and reports the three network traffic flows that originated from endpoint device 110 to comparator 140. For example, as shown in FIG. 8C, network device 120(2) reports a network traffic flow originating from endpoint device 110 and directed towards server 150(3), i.e., IP address 54.239.28.188, that is not reported by either endpoint device 110 or network device 120(1).

After receiving the network traffic flows from endpoint device 110 and from network devices 120(1) and 120(2), comparator 140 may compare the network traffic flows reported by endpoint device 110 and both network devices 120(1) and 120(2) to determine the difference set {difference}={d3}={54.239.188}. In example 800, because comparator 140 may determine that the difference set {difference} does not equal the null set {Ø}, comparator 140 may log the unreported network traffic flow d3 as suspicious and forward the reports summarizing the suspicious network traffic flow to analyzer 160 for further processing to determine whether "stealth" malware is resident on endpoint device 110 and/or network device 120(1).

Figure 9:
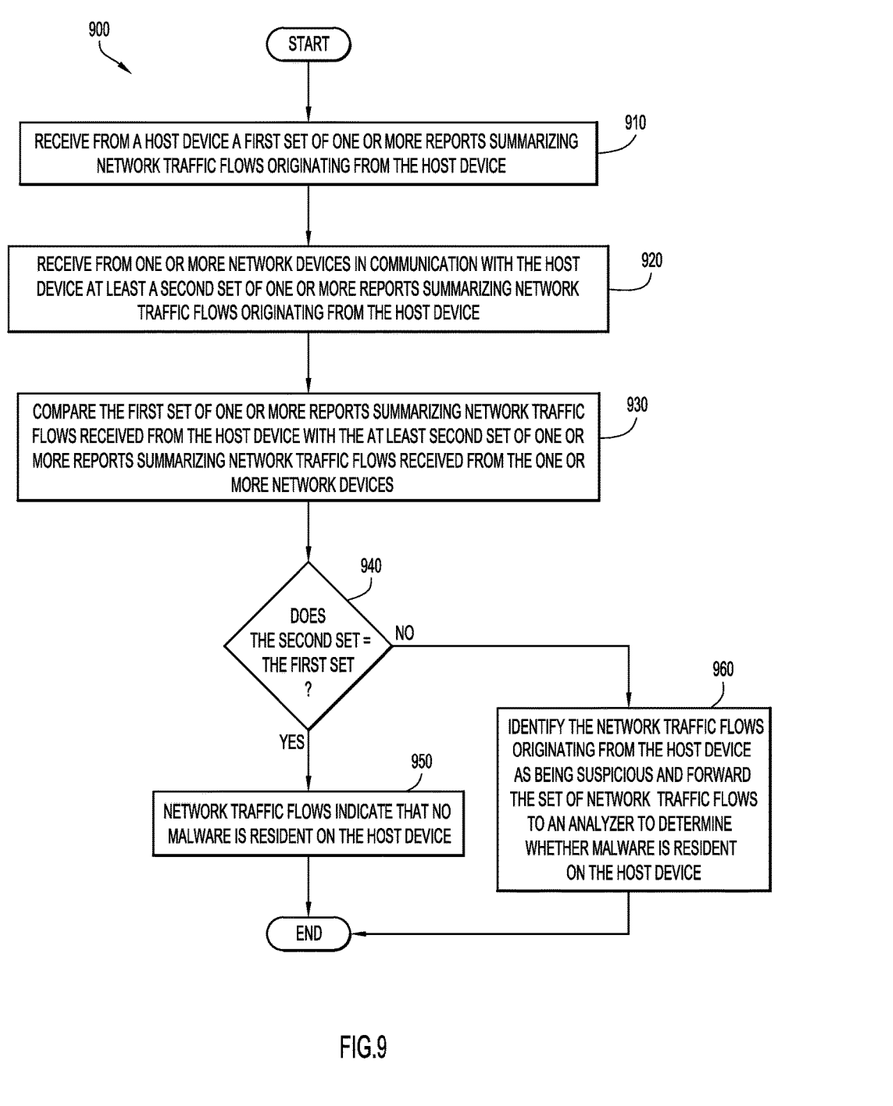
FIG. 9 is a flowchart of operations performed to detect the presence of malware on an endpoint device, according to an example embodiment.

With reference to FIG. 9, a flowchart is shown for example operations of a method 900 performed by comparator 140 to detect the presence of malware on an endpoint device 110. Reference is also made to FIG. 1 for purposes of this description.

Initially, at 910, comparator 140 receives from host endpoint device 110 a first set of one or more reports summarizing (in metadata) network traffic flows originating from the endpoint device 110. At 920, comparator 140 receives from one or more network devices 120 in communication with endpoint device 110 at least a second set of one or more reports summarizing network traffic flows originating from endpoint device 110. At 930, comparator 140 compares the first set of one or more reports summarizing network traffic flows received from the endpoint device 110 with the at least second set of one or more reports summarizing network traffic flows received from the one or more network devices.

At 940, comparator 140 determines whether the at least second set of one or more reports summarizing network traffic flows received from one or more network devices 120 is identical to the first set of one or more reports summarizing network traffic flows received from endpoint device 110 and, if so, the process proceeds to step 950, otherwise, the process proceeds to step 960.

At 950, comparator 140 determines that the network traffic flows do not indicate the presence of malware on endpoint device 110, and the process ends.

At 960, comparator 140 identifies the set of network traffic flows originating from endpoint device 110 as being suspicious and forwards the set of network traffic flows to analyzer 160 to determine whether malware is resident on endpoint device 110, and the process ends.

In summary, embodiments described herein involve performing network traffic flow comparisons to detect the presence of malware on an endpoint host device. According to an embodiment, a network-connected comparator device or process receives network traffic flows originating from an endpoint host device and reported from the endpoint host device with network traffic flows reported from at least one network device, correlates the reported network traffic flows based on identifying attributes, and compares the correlated network traffic flows originating from the endpoint device to determine whether the reported network traffic flows are identical. In response to determining that the correlated network traffic flows originating from the endpoint device and reported from the endpoint device and at least one network device are not identical, the system logs the network traffic flows originating from the endpoint host device as possibly indicating the presence of malware on the endpoint device and forwards the reports summarizing network traffic flows to a network-connected analyzer device or process for further processing. Thus, an observed difference between reported network traffic flows originating from an endpoint device and stored at the endpoint device and reported network traffic flows originating from the endpoint device and stored on an external network device are correlated and compared to detect the presence of malware residing on the endpoint device.

Advantages of the embodiments include providing an additional layer of security to detect "stealthy" malicious software that may have been surreptitiously installed on an endpoint device. Given the enormous costs associated with "stealthy" malicious software, e.g., viruses, worms, Trojan horses, etc., the disclosed embodiments are invaluable as traditional methods of detecting unauthorized soft are often ineffective. For example, a rootkit installed by hooking into authorized applications resident on an endpoint device may not be detectable by ordinary methods. If the rootkit then gains access to the kernel space, it may prevent "dir" commands from listing executable files identifying the rootkit or the endpoint device from reporting network traffic flows generated by the malicious software. Accordingly, traditional methods, which include performing search and reporting functions on the device itself, are often unable to detect the presence of malicious software.

The disclosed embodiments, however, allow system administrators to detect the presence of unauthorized software on an endpoint device, even if the unauthorized software has compromised the kernel space of the endpoint device. According to this embodiment, the system collects at least a second set of one or reports summarizing network traffic flows at one or more network devices. By performing a differential analysis on the network traffic flows originating at an endpoint device and reported by the device with network traffic flows originating at the endpoint device but reported by one or more network devices, the disclosed method and system may detect the presence of malware on a compromised endpoint host device even if the malware has gained root access. Furthermore, if the nearest network device to the endpoint device is also compromised, the disclosed embodiments may still be able to detect the presence of malware on the endpoint host device by comparing the network traffic flows reported by the endpoint device with network traffic flows reported by a plurality of network devices.

According to this embodiment, if the reported network traffic flows are not all identical, the system logs the network traffic flows originating from the endpoint device as suspicious and forwards the network traffic flows to an analyzer for further processing, notwithstanding that neither the endpoint device nor the network device nearest to the endpoint device reported the suspicious network traffic flows. The system therefore determines a difference set of network traffic flows originating from the host device, wherein the difference set comprises network traffic flows originating from the host device and in a second set of one or more reports summarizing network traffic flows received from the one or more network devices but not in a first set of one or more reports summarizing network traffic flows received from the host device. In so doing, the system classifies the difference set of one or more reported network traffic flows originating from the host device into one or more related groups of at least one reported network traffic flow based on identifying information, analyzes the one or more related groups of at least one reported network traffic flow to determine whether the one or more related groups of at least one reported network traffic flow originated from unauthorized software located on the host device, and if the system determines that at least one reported network traffic flow originated from unauthorized software located on the host device, transmits the one or more related groups of at least one reported network traffic flow to a network-connected entity, which may compare the at least one reported network traffic flow in the one or more related groups with at least one network traffic flow pattern indicative of unauthorized software to determine whether unauthorized software is resident on the endpoint host device. Accordingly, the ability of the disclosed method and system to detect unauthorized software on an endpoint host device is robust and resistant to malicious attacks.

Another advantage of the disclosed embodiments is that the disclosed method and system filters the enormous amount of network traffic flows originating at a plurality of endpoint host devices to only those network traffic flows that are indicative of sophisticated malware residing on the endpoint host devices. The disclosed method and system therefore enhances the ability of a network-connected analyzer device or process to identify sophisticated malicious software, allowing system administrators and/or users to successfully remove malicious software from compromised endpoint host devices.

In one form, a method is provided comprising: receiving from a host device a first set of one or more reports summarizing network traffic flows originating from the host device; receiving from one or more network devices in communication with the host device at least a second set of one or more reports summarizing network traffic flows originating from the host device; comparing the first set of one or more reports summarizing network traffic flows received from the host device with the at least second set of one or more reports summarizing network traffic flows received from the one or more network devices; and based on the comparing, determining whether unauthorized software is present on the host device.

In another form, an apparatus is provided comprising: a network interface unit that enables network communications; and a processor, coupled to the network interface unit, and configured to: receive from a host device a first set of one or more reports summarizing network traffic flows originating from the host device; receive from one or more network devices in communication with the host device at least a second set of reports summarizing one or more network traffic flows originating from the host device; compare the first set of one or more reports summarizing network traffic flows received from the host device with the at least second set of one or more reports summarizing network traffic flows received from the one or more network devices; and based on the comparing, determine whether unauthorized software is present on the host device.

In yet another form, a non-transitory processor readable medium storing instructions that, when executed by a processor, cause the processor to: receive from a host device a first set of one or more reports summarizing network traffic flows originating from the host device; receive from one or more network devices in communication with the host device at least a second set of one or more reports summarizing network traffic flows originating from the host device; compare the first set of one or more reports summarizing network traffic flows received from the host device with the at least second set of one or more reports summarizing network traffic flows received from the one or more network devices; and based on the comparing, determine whether unauthorized software is present on the host device.

The above description is intended by way of example only. Various modifications and structural changes may be made therein without departing from the scope of the concepts described herein and within the scope and range of equivalents of the claims.

What is claimed is:

1. A method comprising:
   receiving, from a host device, a first set of one or more traffic flow reports, wherein the first set of one or more traffic flow reports summarize network traffic flows originating from the host device;
   receiving, from one or more intermediary network devices in communication with the host device, at least a second set of one or more traffic flow reports, wherein the at least second set of one or more traffic flow reports summarize network traffic flows originating from the host device and which network traffic flows are received at the one or more intermediary network devices;
   comparing the first set of one or more traffic flow reports received from the host device with the at least the second set of one or more traffic flow reports received from the one or more intermediary network devices to determine whether there are any differences in network traffic flows originating from the host device; and
   based on the comparing, determining whether unauthorized software is present on the host device by:
   grouping differences in network traffic flows originating from the host device based on the comparing into one or more related groups of at least one network traffic flow based on identifying information; and
   analyzing the one or more related groups of at least one network traffic flow to determine whether the one or more related groups of at least one network traffic flow originated from unauthorized software located on the host device.

2. The method of claim 1, wherein the at least second set of one or more traffic flow reports received from the one or more intermediary network devices is collected at the one or more intermediary network devices.

3. The method of claim 1, wherein comparing the first set of one or more traffic flow reports received from the host device with the at least second set of one or more traffic flow reports received from the one or more intermediary network devices further comprises:
   determining a difference set of one or more network traffic flows originating from the host device, wherein the difference set of one or more network traffic flows comprises:
   network traffic flows originating from the host device that are included in the second set of one or more traffic flow reports received from the one or more intermediary network devices, but which are not included in the first set of one or more traffic flow reports received from the host device.

4. The method of claim 3, wherein each network traffic flow included in the difference set of one or more network traffic flows is logged as suspicious.

5. The method of claim 1, wherein the identifying information comprises one or more fields in an Internet Protocol (IP) Flow Information Export ("IPFIX") data packet.

6. The method of claim 1, wherein analyzing the one or more related groups of at least one network traffic flow to determine whether the one or more related groups of at least one network traffic flow originated from unauthorized software located on the host device further comprises transmitting the one or more related groups of at least one network traffic flow to a network-connected entity for further processing.

7. The method of claim 6, wherein the further processing comprises comparing the at least one network traffic flow in the one or more related groups with at least one network traffic flow pattern indicative of unauthorized software.

8. The method of claim 1, wherein the one or more network traffic flows originating from the host device is an Internet Protocol (IP) packet flow.

9. The method of claim 1, wherein the one or more intermediary network devices includes a network device that is nearest, in number of hops, to the host device.

10. The method of claim 1, wherein the unauthorized software is malware or rootkit software.

11. An apparatus, comprising:
a network interface unit that enables network communications; and
a processor, coupled to the network interface unit, and configured to:
receive, from a host device, a first set of one or more traffic flow reports, wherein the first set of one or more traffic flow reports summarize network traffic flows originating from the host device;
receive, from one or more intermediary network devices in communication with the host device, at least a second set of one or more traffic flow reports, wherein the at least second set of one or more traffic flow reports summarize network traffic flows originating from the host device and which network traffic flows are received at the one or more intermediary network devices;
compare the first set of one or more traffic flow reports received from the host device with the at least second set of one or more traffic flow reports received from the one or more intermediary network devices to determine whether there are any differences in network traffic flows originating from the host device; and
based on the comparing, determine whether unauthorized software is present on the host device by:
grouping differences in network traffic flows originating from the host device based on the comparing into one or more related groups of at least one network traffic flow based on identifying information; and
analyzing the one or more related groups of at least one network traffic flow to determine whether the one or more related groups of at least one network traffic flow originated from unauthorized software located on the host device.

12. The apparatus of claim 11, wherein the at least second set of one or more traffic flow reports is collected at the one or more intermediary network devices.

13. The apparatus of claim 11, wherein the processor is configured to compare the first set of one or more traffic flow reports received from the host device with the at least second set of one or more traffic flow reports received from the one or more intermediary network devices by:
determining a difference set of one or more network traffic flows originating from the host device, wherein the difference set of one or more network traffic flows originating from the host device comprises:
network traffic flows originating from the host device that are included in the second set of one or more traffic flow reports received from the one or more intermediary network devices, but which are not included in the first set of one or more traffic flow reports received from the host device.

14. The apparatus of claim 13, wherein the processor is configured to log each network traffic flow included in the difference set of one or more network traffic flows as suspicious.

15. The apparatus of claim 11, wherein the processor is further configured to transmit the one or more related groups of at least one network flow to a network-connected entity for further processing.

16. A non-transitory processor readable medium storing instructions that, when executed by a processor, cause the processor to:
receive, from a host device, a first set of one or more traffic flow reports, wherein the first set of one or more traffic flow reports summarize network traffic flows originating from the host device;
receive, from one or more intermediary network devices in communication with the host device, at least a second set of one or more traffic flow reports, wherein the at least second set of one or more traffic flow reports summarize network traffic flows originating from the host device and which network traffic flows are received at the one or more intermediary network devices;
compare the first set of one or more traffic flow reports received from the host device with the at least second set of one or more traffic flow reports received from the one or more intermediary network devices to determine whether there are any differences in network traffic flows originating from the host device; and
based on the comparing, determine whether unauthorized software is present on the host device by:
grouping differences in network traffic flows originating from the host device based on the comparing into one or more related groups of at least one network traffic flow based on identifying information; and
analyzing the one or more related groups of at least one network traffic flow to determine whether the one or more related groups of at least one network traffic flow originated from unauthorized software located on the host device.

17. The non-transitory processor readable medium of claim 16, wherein the at least second set of one or more traffic flow reports received from the one or more intermediary network devices is collected at the one or more intermediary network devices.

18. The non-transitory processor readable medium of claim 16, wherein the instructions operable to compare the first set of one or more traffic flow reports received from the host device with the at least second set of one or more traffic flow reports received from the one or more intermediary network devices comprise instructions operable for:
determining a difference set of one or more network traffic flows originating from the host device, wherein the difference set of one or more network traffic flows originating from the host device comprises:
network traffic flows originating from the host device that are included in the second set of one or more traffic flow reports received from the one or more intermediary network devices, but which are not included in the first set of one or more traffic flow reports received from the host device.

19. The non-transitory processor readable medium of claim 18, wherein the instructions are configured to log each network traffic flow included in the difference set of one or more network traffic flows as suspicious.

20. The non-transitory processor readable medium of claim 16, further comprising instructions operable to transmit the one or more related groups of at least one network traffic flow to a network-connected entity for further processing.

* * * * *